Patented Jan. 28, 1930

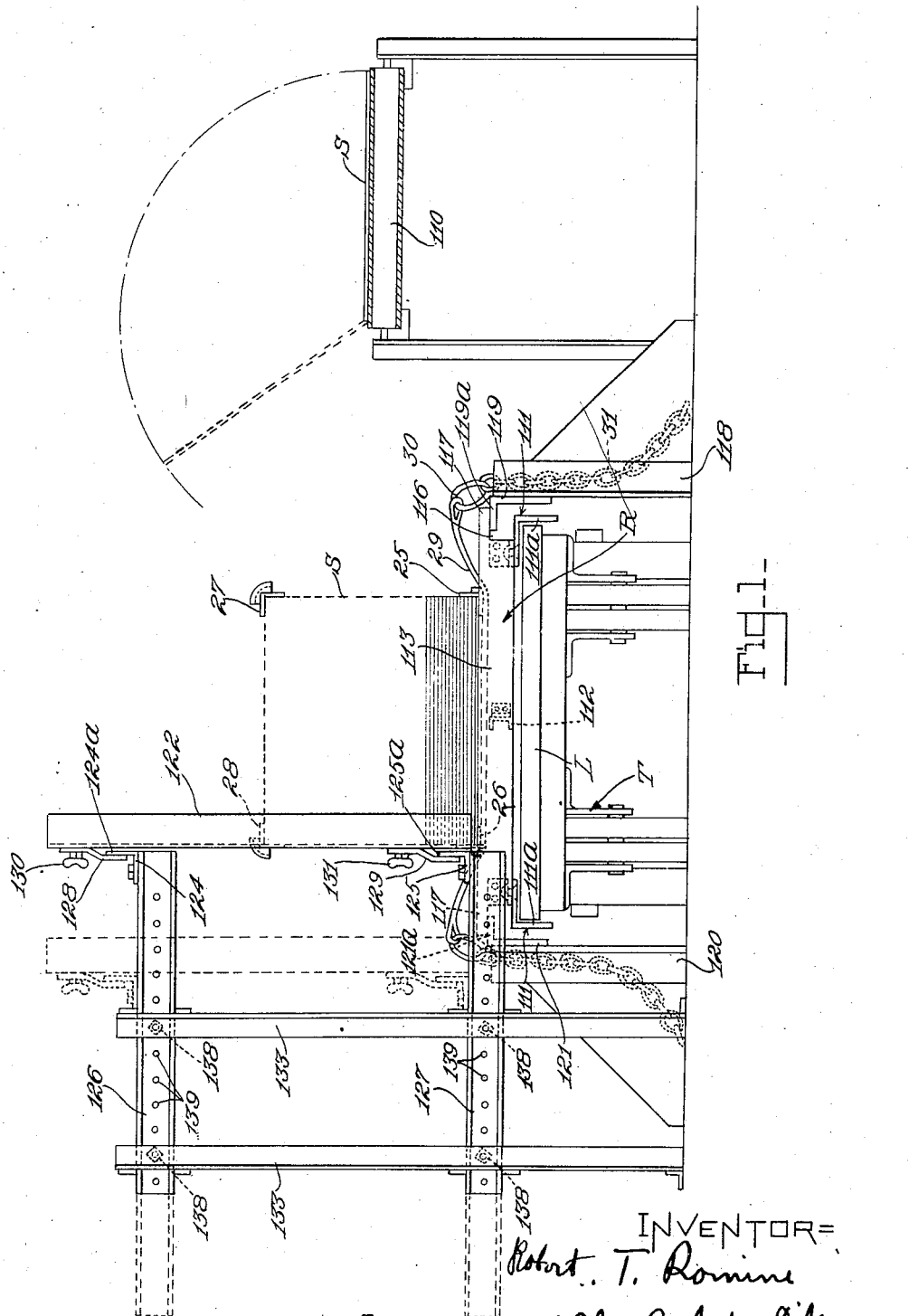

1,745,041

UNITED STATES PATENT OFFICE

ROBERT T. ROMINE, OF DETROIT, MICHIGAN

PORTABLE LOADING PLATFORM

Original application filed March 11, 1926, Serial No. 93,871. Divided and this application filed April 24, 1926. Serial No. 104,378.

This invention relates to a portable loading platform or apparatus particularly, although not exclusively, adapted for enabling metal, such as sheet steel, to be loaded or stacked and readily transported or hauled away, as by means of an industrial truck, having a load elevating platform.

An object of this invention is to provide an improved loading apparatus in which a loading or stacking platform is so supported as to permit the load elevating platform of an industrial truck to be propelled beneath the stacking platform, to remove the same with its load from its supports, and haul it away.

A further object of the invention is to provide a loading or stacking platform supported to permit a load elevating truck to be propelled therebeneath and pick up the platform from its supports, and wherein improved means is provided for enabling metal sheets or the like to be guided or positioned in order to form uniform or even stacks on the platform, and also to permit the stack or bundle to be tied or clamped together in a unit after being stacked.

Another object of the invention is the provision of a portable stacking platform capable of sustaining heavy loads such as ten ton stacks of sheet steel, and in which means is provided for guiding the truck platform therebeneath and for distributing uniformly the upward thrust of the truck between opposite ends of the stacking platform.

Other objects of this invention will appear in the following description and appended claims, reference being had to the accompanying drawings forming a part of this specification, wherein like reference characters designate corresponding parts in the several views.

Fig. 1 is an end elevation illustrating the improved apparatus and the manner of delivering and loading metal such as sheet steel.

Figure 3:
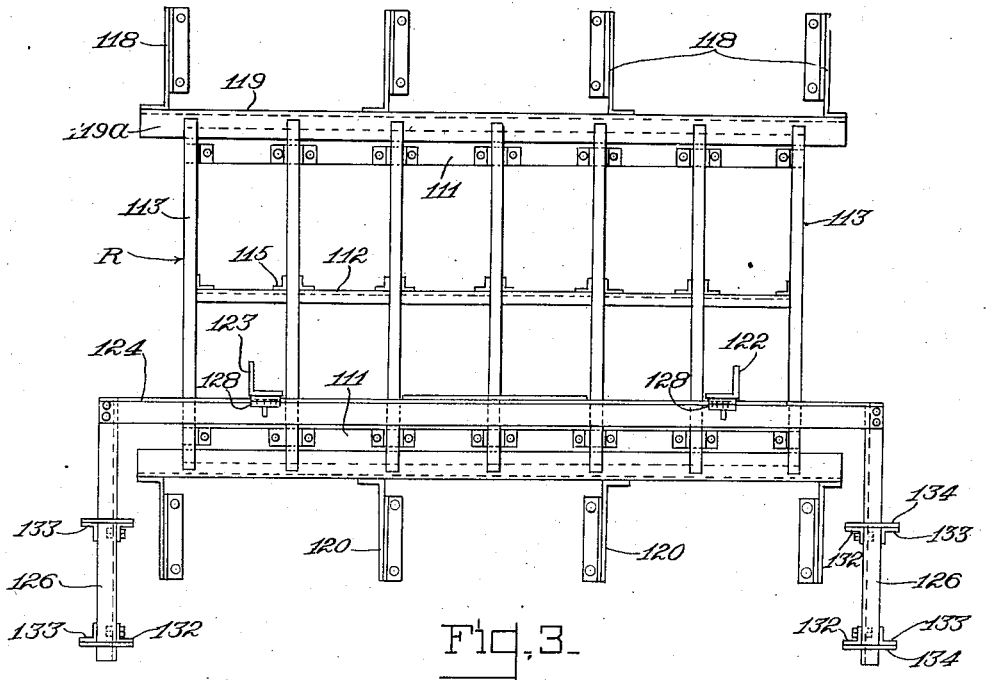
Fig. 3 is a plan view of the construction shown in Fig. 2.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

This application is a division of my co-pending application Serial No. 93,871, filed March 11, 1926 for loading or unloading apparatus and method now Patent 1,615,812, patented January 25, 1927.

In the drawings, for the purpose of illustration, I have shown the invention as applied in connection with the handling and loading of metal, such as sheet steel, at the steel rolling mill preparatory to delivering and packing the sheets in freight cars for shipment. The metal sheets are carried on a suitable conveyor 110 to the point of delivery, at which point is located, preferably at one side of the conveyor, a delivery or stacking apparatus, including a removable stacking platform or pallet R for supporting the pile or stack of sheets or other metal, and supported in position to be picked up and bodily hauled by a load elevating truck. The stacking apparatus is so constructed as to enable heavy loads, such as loads weighing ten tons or more to be carried on the platform and the improved construction is also such as to permit a load elevating truck of ten ton capacity to elevate the stacking platform from underneath. To prevent the upward thrust of the truck platform from breaking off any of the cross members of the stacking platform, the latter is constructed so that the upward thrust of the truck platform will be uniformly distributed between the ends of the stacking platform.

The pallet or platform R comprises in the present instance a pair of lengthwise extending angle bars 111, the vertical flanges 111$^a$ of which form spaced guides for guiding the truck T beneath the pallet. A series of spaced cross bars 113 are mounted edgewise upon and secured to the side angle bars 111, and are held in position by channel spacer members 112 secured to the cross bars by angles 115. The upper edges of the cross bars 113 extend above the upper edges of the channels, as clearly shown in Figure 1.

Each cross bar 113 at each end thereof is notched or cut away at 116, thereby providing projecting portions 117 which may be supported upon the horizontal flanges 119$^a$ and 121$^a$ of lengthwise extending angle bars 119 and 121. These angle bars are spaced apart the required distance and supported by suitable legs or supporting brackets 118 and 120.

The sheets S when deposited on the platform or pallet R are guided and positioned in superimposed relation by means of a pair of adjustably spaced vertical guides 122 and 123. These guides are slidingly supported to permit them to be shifted into and out of position over the pallet R. At the upper and lower ends of the guides are located lengthwise extending angle bars 124 and 125 respectively. The upper angle bar 124 is secured at each end to a slide bar 126, and the lower angle bar 125 in like manner is secured at each end to a corresponding slide bar 127. Each guide 122 and 123 at its upper end carries a projecting clamp 128 adapted to fit over the vertical flange 124$^a$ of the upper angle bar 124. In like manner, each guide 122 and 123 at its lower end carries a similar clamp 129 fitting over the flange 125$^a$. The guide bars 122 and 123 may be adjusted along the supporting bars 124 and 125 to the required positions, and are releasably secured in adjusted positions to the bars 124 and 125 by turning the wing nuts 130 and 131 to tighten the clamps 128 and 129 against the bars.

Figure 2:
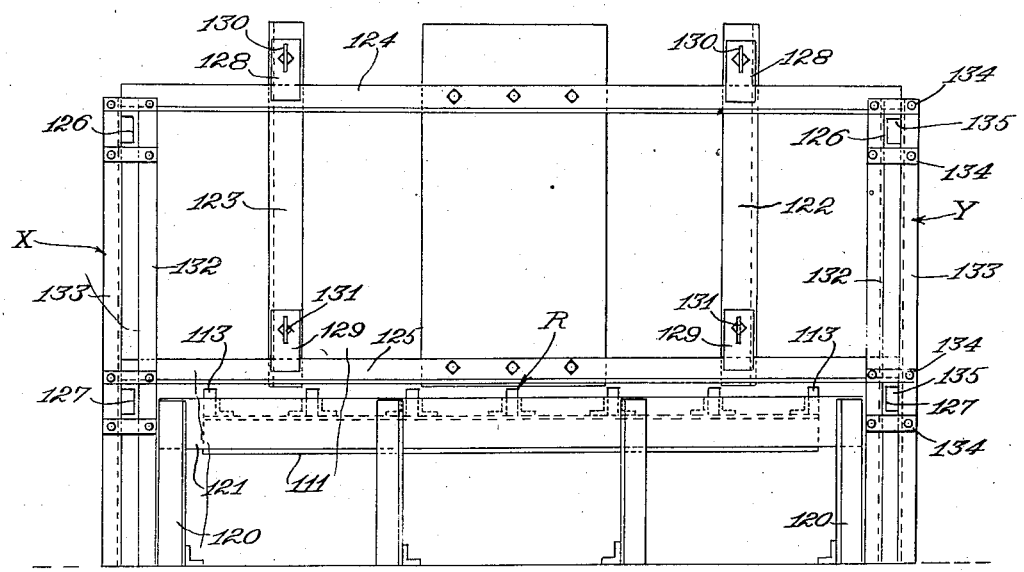
Fig. 2 is a front elevation of the stacking platform or apparatus.

The slide bars 126 and 127 which carry the guides are mounted in side frames X and Y, comprising spaced pairs of vertical angle bars 132 and 133, the side frames being spaced apart a distance greater than the length of the platform R, as shown in Fig. 2. Vertically spaced plates 134 are secured to the posts 132 and 133 thereby forming guideways 135 for the upper and lower slide bars 126 and 127. These bars may be adjusted in position with respect to the pallet R and held in adjusted position by means of bolts 138 which may be secured in any one of the holes 139 in the bars 126 and 127.

From the foregoing it will be seen that by adjusting the position of the slide bars 126 and 127, the guides 122 and 123 may be properly positioned over the pallet R in accordance with the width of the sheet, enabling the sheets when deposited against the guides to be centered on the pallet. By adjusting the guides toward or from each other, the forwardly extending flanges thereof may be spaced apart sufficiently to permit the sheets to fit therebetween. These guides therefore position the edges of the sheets, thus enabling the piling or stacking of the sheets in uniform relation. In use the pallet or platform R is placed in position on the angle bars 119 and 121 as shown in Fig. 1. The tying cables or any other suitable binding means or devices are laid across the pallet in the recesses or guideways between the cross bars 113. The sheets are removed from the conveyor by turning them on edge and placing them one upon another on the pallet R without sliding the sheets. When a suitable number of sheets have been stacked the angle plates 25, 26, 27 and 28 are placed at the corners of the stack, and the cables or binders 29—31 placed around the stack, such devices being tightened as described in my co-pending application to clamp the angle plates on the corners of the stack. After the stack S has been formed, the platform L of the truck T is run into position beneath the pallet R. Thereupon the guides 122 and 123 are slid rearwardly to clear the pallet, as shown in dotted lines, and the truck platform elevated sufficiently to enable the pallet or platform R with its load to be carried from its supports and thence to the freight car. It will be seen that by notching the cross members of the platform at 116 the truck platform having substantially as great width as the pallet R may be elevated beneath the angle portions 119$^a$ and 121$^a$ sufficiently to enable the pallet to be cleared from its supports.

In the foregoing description I have illustrated in accordance with my invention the method of loading the metal in piles, stacks or bundles, from the conveyor which delivers the material at the mill. For the purpose of illustrating the invention, the metal is shown in the form of metal sheets or sheet steel, but the invention is not limited to the particular type of stock which may be handled in accordance with this invention.

As above described, a stack or pile, comprising a predetermined number of sheets or pieces, all of a predetermined weight, such as ten tons, is tied or bound together in a bundle on the pallet R, and thereafter the truck platform L is elevated to pick up the pallet and bundle from the supports 118 and 120. The truck may then be run or propelled with its load directly into the freight car through the doorway of the car, as described in my above mentioned application. When the load or bundle S on the stacking platform or pallet R is thus brought into the car, it is then removed from the pallet and deposited in position to be secured in the car for shipment.

From the foregoing description, it will be noted that the stacking platform R is constructed to have substantially the width of the truck elevating platform L, but is provided with extension members 117 at the upper longitudinal edges thereof for the purpose of overlying the supporting angle members 119 and 121 of the supporting legs. In this manner the bottom of the pallet R is normally supported just high enough to permit the truck platform to be propelled therebeneath, and guided into position by means of the vertical flanges 111ª.

Thus the platform R comprises a main portion having supporting extensions 117, and the over-all width of the platform including these extensions is substantially the same as the width of the truck platform. In loading a freight car as described in my above mentioned application, it is important that the platform R be restricted in width to approximately that of the truck platform in order to provide proper clearances within the car for succeeding unloading operations.

It will also be noted that the angle iron members 111 project outwardly from the base of the platform, providing guides 111ª spaced apart to guide the truck into position beneath the platform R. The inwardly extending horizontal flanges of these angle bars 111 receive the upward thrust of the truck platform when elevated, thus distributing this thrust uniformly to all of the cross members of the platform and preventing any of these members from breaking off. The space between the horizontal flanges of angle bars 111 and the horizontal flanges 119ª represents slightly more than the vertical distance that the truck platform is elevated to remove the pallet from its supports, this distance in practice being usually several inches.

What I claim is:

1. A loading apparatus comprising spaced upright supports, a pallet mounted on said supports, an alining guide, and means for adjustably supporting said guide at one side of the pallet to permit the same to be bodily shifted into various positions overlying the pallet and also away from the pallet.

2. A loading apparatus comprising spaced upright supports, a pallet mounted on said supports, an alining guide, means for adjustably supporting said guide at one side of the pallet to permit the same to be bodily shifted transversely into various positions overlying the pallet and also away from the pallet, and means for adjusting said guide longitudinally of the pallet.

3. A loading apparatus comprising a raised platform, a pair of guides for positioning the material to be deposited on the platform, means for adjusting said guides to accommodate different lengths of material, and means for movably supporting said guides to permit removal thereof in order to remove the platform and load.

4. A loading apparatus comprising a platform, a pair of guides for positioning the material to be placed upon the platform, means for adjusting said guides to accommodate different lengths of material, means for adjusting said guides to centre the material on the platform, and means for slidingly supporting said guides to permit the same to be shifted away from the platform at predetermined times.

5. A loading apparatus comprising a platform, spaced supports for supporting said platform in position to permit a lifting truck to be propelled therebeneath and raise the platform, said platform comprising cross members provided with supporting extensions removably mounted on said supports, and angle members extending beneath said cross members and providing means for receiving the upward thrust of the truck and for guiding the truck beneath the platform.

6. A loading apparatus comprising spaced supports, a platform removably mounted thereon and supported thereby in position to permit a lifting truck to be propelled beneath the same to raise it from said supports, a frame slidable into and out of position over said platform, and spaced upright guides adjustable toward and from each other on said frame for positioning the material to be loaded on the platform.

7. A loading apparatus comprising spaced supports, a platform removably mounted thereon and supported thereby in position to permit a lifting truck to be propelled beneath the same to raise it from said supports, a guide frame adjustable into different positions overlying said platform, and relatively adjustable guide members carried by said frame for positioning the material to be loaded on the platform.

8. A loading apparatus comprising a platform supported in position to permit a lifting truck to be propelled beneath the same to raise it, a pair of relatively adjustable guide members, and a guide frame carrying said guides and adjustable into different positions to cause said guide members to overlie said platform for positioning the material to be loaded on the platform.

9. In a loading apparatus, a pair of spaced upright supports, a horizontally extending angle bar carried at the upper end of each support and having inwardly extending supporting flanges, a removable platform having extensions at opposite sides thereof adapted to be supported upon said flanges, and an angle bar secured to the bottom of the platform at each side thereof beneath said extensions and forming a space beneath said extensions for permitting the platform to be raised vertically.

10. A loading apparatus comprising spaced supports, a platform having supporting extensions at the opposite side edges thereof r movably mounted on said supports, guide means for positioning a stack of sheets or the like on said platform, said platform having at the upper face thereof transverse guideways for housing binding means extending under the stack for binding the same in a bundle.

In testimony whereof I affix my signature.

ROBERT T. ROMINE.